US012790671B2

(12) United States Patent
Porret et al.

(10) Patent No.: US 12,790,671 B2
(45) Date of Patent: Nov. 10, 2026

(54) NICKEL-FREE AUSTENITIC STAINLESS-STEEL POWDER COMPOSITION AND PART PRODUCED BY SINTERING BY MEANS OF THIS POWDER

(71) Applicant: The Swatch Group Research and Development Ltd, Marin (CH)

(72) Inventors: Joël Porret, Marin-Epagnier (CH); Ludovic Giller, Marly (CH)

(73) Assignee: The Swatch Group Research and Development Ltd, Marin (CH)

( * ) Notice: Subject to any disclaimer, the term of this patent is extended or adjusted under 35 U.S.C. 154(b) by 922 days.

(21) Appl. No.: 17/607,559

(22) PCT Filed: May 8, 2020

(86) PCT No.: PCT/EP2020/062805
§ 371 (c)(1),
(2) Date: Oct. 29, 2021

(87) PCT Pub. No.: WO2020/229325
PCT Pub. Date: Nov. 19, 2020

(65) Prior Publication Data
US 2022/0205070 A1 Jun. 30, 2022

(30) Foreign Application Priority Data
May 16, 2019 (EP) ..................................... 19174979

(51) Int. Cl.
*C22C 33/02* (2006.01)
*B22F 1/05* (2022.01)
(Continued)

(52) U.S. Cl.
CPC ............ *C22C 33/0285* (2013.01); *B22F 1/05* (2022.01); *B22F 3/15* (2013.01); *B22F 3/24* (2013.01);
(Continued)

(58) Field of Classification Search
None
See application file for complete search history.

(56) References Cited

U.S. PATENT DOCUMENTS 4,314,849 A * 2/1982 Ro ...................... C22C 33/0235 419/57
6,641,640 B1 * 11/2003 Hesse ................... C22C 29/067 419/37
(Continued)

FOREIGN PATENT DOCUMENTS

CN 101353768 A 1/2009
CN 101342591 B 9/2010
(Continued)

OTHER PUBLICATIONS

Translation—DE-19607828-A1, Menzel J, Oct. 17, 1996, (Year: 1996).*
(Continued)

*Primary Examiner* — Seth Dumbris
(74) *Attorney, Agent, or Firm* — Oblon, McClelland, Maier & Neustadt, L.L.P.

(57) ABSTRACT

An austenitic stainless-steel powder having a nickel content of less than or equal to 0.5% by weight and a specific carbon content that is greater than or equal to 0.05% and less than or equal to 0.11% by weight. A method for manufacturing the powder by powder metallurgy and parts resulting from the manufacturing method, which have the characteristic of having a deoxidised layer on the surface of the part extending over a thickness greater than or equal to 200 μm.

18 Claims, 3 Drawing Sheets

(51) Int. Cl.

| | |
|---|---|
| ***B22F 3/15*** | (2006.01) |
| ***B22F 3/24*** | (2006.01) |
| ***B33Y 40/20*** | (2020.01) |
| ***C22C 38/00*** | (2006.01) |
| ***C22C 38/02*** | (2006.01) |
| ***C22C 38/20*** | (2006.01) |
| ***C22C 38/22*** | (2006.01) |
| ***C22C 38/38*** | (2006.01) |

(52) U.S. Cl.

CPC ............ *B33Y 40/20* (2020.01); *C22C 38/001* (2013.01); *C22C 38/02* (2013.01); *C22C 38/20* (2013.01); *C22C 38/22* (2013.01); *C22C 38/38* (2013.01); *B22F 2003/248* (2013.01); *B22F 2201/02* (2013.01); *B22F 2304/10* (2013.01)

(56) References Cited

U.S. PATENT DOCUMENTS

| | | | | |
|---|---|---|---|---|
| 2005/0274223 | A1* | 12/2005 | Schade | C22C 33/0228 75/252 |
| 2016/0124391 | A1* | 5/2016 | Charbon | C22C 38/44 420/45 |
| 2017/0088923 | A1* | 3/2017 | Porret | C22C 38/38 |

FOREIGN PATENT DOCUMENTS

| | | | | | |
|---|---|---|---|---|---|
| CN | 102965584 | A | | 3/2013 | |
| CN | 106987785 | A | | 7/2017 | |
| CN | 108546889 | A | | 9/2018 | |
| DE | 19607828 | A1 | * | 10/1996 | C22C 38/001 |
| EP | 3 147 378 | A1 | | 3/2017 | |
| JP | 7-157847 | A | | 6/1995 | |
| JP | H07157847 | A | * | 6/1995 | |
| JP | 2008303413 | A | * | 12/2008 | |

OTHER PUBLICATIONS

Millipore Sigma "Particle Size Conversion Table".https://www.sigmaaldrich.com/US/en/support/calculators-and-apps/particle-size-conversion-table?srsltid=AfmBOorssF8EPzxAMU0W2L30SpuyDNsPknvAX-jMpoi45fqKkYjV24Rc (Year: 2024).*

Combined Chinese Office Action and Search Report issued on Mar. 11, 2022 in Patent Application No. 202080034867.2 (with English translation of Office Action and Translation of Category of Cited Documents), 10 pages.

International Search Report issued on Aug. 17, 2020 in PCT/EP2020/062805 filed on May 8, 2020, 2 pages.

* cited by examiner

NICKEL-FREE AUSTENITIC STAINLESS-STEEL POWDER COMPOSITION AND PART PRODUCED BY SINTERING BY MEANS OF THIS POWDER

FIELD OF THE INVENTION

The invention relates to a nickel-free austenitic stainless-steel powder composition. It also relates to a part, in particular a timepiece external part, produced by sintering by means of this powder, as well as to the sintering manufacturing method.

BACKGROUND OF THE INVENTION

Sintering stainless-steel powders is at present very widespread. It can in particular be carried out on blanks obtained by injection (metal injection moulding), extrusion, pressing or other additive manufacturing. In the most traditional manner, sintering austenitic stainless steels consists in consolidating and densifying a powder of such a steel in a high-temperature furnace (1200-1400° C.), under vacuum or under gaseous protective atmosphere. The properties of the parts after sintering (density, mechanical and magnetic properties, corrosion resistance, etc.) for a given powder composition depend greatly on the sintering cycle used. The following parameters are particularly important: heating rate, sintering temperature and time, sintering atmosphere (gas, gas flow, pressure) and cooling rate.

For fields such as horology, where aesthetics are particularly important, two characteristics of the microstructure after sintering are particularly important, namely the density and the presence of inclusions. The presence of porosities or non-metallic inclusions, in particular of oxides, is in fact very detrimental for the rendition after polishing. To obtain a polished part having a brightness and a colour similar to welded stainless steel, it is therefore necessary to aim at a density close to 100% and a minimum of non-metallic inclusions.

With regard to density, solutions are known for eliminating any porosity, at least on the surface, in parts made from nickel-free austenitic stainless steels formed by powder metallurgy. These solutions consist among other things in implementing hot isostatic pressing (HIP) on sintered parts the porosity of which is closed.

With regard to oxides, it is mainly the high concentration of manganese in nickel-free austenitic stainless steels that is problematic for forming by powdered metallurgy. This is because the great affinity of this element with oxygen, coupled with the high specific surface of the powders, requires great mastery of the processes which are performed at high temperature:

- it is necessary first of all to use a powder where the surface of the particles is as little oxidised as possible;
- it is necessary also to minimise the oxidation of the powder during heating of the parts to the sintering temperature by using a highly reducing atmosphere. However, for austenitic stainless steels in the composition of which nitrogen is introduced in order to dispense with the use of nickel, the sintering atmosphere must necessarily include nitrogen, with the consequence that it is not possible to work with an atmosphere containing only reducing agents;
- finally, it is necessary to reduce the oxides that are the most stable at high temperature and to eliminate the reduction products before the porosity is closed. This is the most critical point since, during the sintering operations, the manganese oxides are reduced at the same time as the pores are closed, at a temperature generally above 1200° C. Consequently, typically parts are obtained with a layer that is well deoxidised on the surface and numerous inclusions (oxides) at the core. This is because, on the surface of the parts, the atmosphere of the furnace is more easily renewed and the reduction products can be transported throughout the volume of the furnace when, at the start of sintering, the porosity is still open. At the core, on the other hand, the atmosphere is not renewed and the conditions do not allow total reduction of the oxides before the porosity is closed. For nickel-free austenitic stainless steels, it is thus very difficult to have a deoxidised layer the thickness of which is greater than 200 μm. As the finishing of the parts (machining, polishing) after sintering requires a removal of material that may be greater than 200 μm, oxides may be present on the surface of the finished parts, which is detrimental both from the aesthetic point of view and from the point of view of corrosion resistance for the polished surfaces.

There is therefore a need to increase the thickness of this deoxidised layer for parts formed by sintering nickel-free austenitic stainless-steel powders.

SUMMARY OF THE INVENTION

The object of the present invention is to propose a nickel-free austenitic stainless-steel powder composition making it possible to obtain, after sintering, a particularly deep deoxidised layer, namely greater than or equal to 200 μm.

Deoxidised layer means a layer having finely dispersed oxides of small size. Preferentially, the diameter of the oxides is less than 2 μm and the surface proportion of these oxides is less than 0.1% in this layer. These finely dispersed oxides do not have any impact at the aesthetic level after polishing. Outside this deoxidised layer, the diameter of the oxides may typically be as much as 5 μm and the surface proportion of the oxides may range up to 1%.

To obtain this deoxidised layer with a greater thickness, it is necessary to select a nickel-free austenitic stainless-steel powder having a concentration of carbon by mass greater than or equal to 0.05% and less than or equal to 0.11%. The carbon in fact allows a reduction of the most stable oxides, particularly the manganese oxides and the mixed manganese and silicon oxides, at a temperature that may be less than or equal to 1200° C. Given that, below 1200° C., the densification is small and the porosity remains open, the presence of carbon makes it possible to deoxidise to a greater depth, elimination of the reduction products and renewal of the atmosphere inside the product being favoured. This reduction in the oxides by the carbon at high temperature is commonly referred to as carbothermic reduction and, for example, for a manganese oxide, complies with the following reaction:

$$MnO+C \rightarrow Mn+CO.$$

It has been shown, during several sintering tests implemented on nickel-free austenitic stainless-steel powders, that the carbon concentration must be selected in the specific range 0.05-0.11% by weight. This optimum concentration makes it possible to obtain a deoxidised layer that is as thick as possible, while avoiding problematic decarburisation of the parts. This is because, when the concentration by mass of carbon is below 0.05% by weight, the carbothermic reduction is not complete and the deoxidised layer is reduced. On the other hand, an excessively high concentration of carbon is problematic since the decarburisation resulting from the reaction with the hydrogen present in the sintering atmosphere cannot be controlled and large variations in carbon concentration between the parts are observed. With concentrations by mass of carbon in the nickel-free austenitic stainless-steel powder of between 0.05 and 0.11%, any variations in carbon concentration are sufficiently small not to influence the microstructure and the mechanical and physical properties of the parts after sintering.

BRIEF DESCRIPTION OF THE FIGURES

Other features and advantages of the present invention will emerge from the reading of the following detailed description referring to the following figures.

DESCRIPTION OF THE INVENTION

Figure 1:
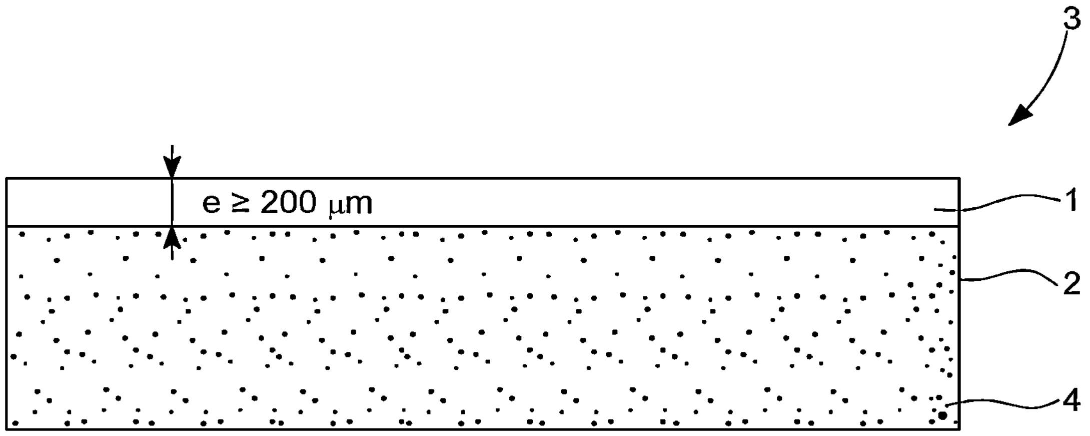
FIG. 1 illustrates schematically the transition between the deoxidised layer and the remainder of the part according to the invention.

The invention relates to an austenitic stainless-steel powder and more specifically an austenitic stainless-steel powder comprising nitrogen in order to reduce or even dispense with nickel, known for the allergenic character thereof. According to the invention, this austenitic stainless-steel powder includes a specific carbon content selected for optimising the carbothermic reaction on the surface of the part during sintering thereof. The invention also relates to a method for manufacturing, by powder metallurgy, mechanical parts with a technical and/or aesthetic function and more specifically of a decorative article. More particularly, the mechanical part may be a horological external part selected from the non-exhaustive list comprising a middle, a bottom, a bezel, a push-piece, a bracelet link, a bracelet, a tongue buckle, a dial, a hand, a crown and a dial index. It may also be a gemwork or jewellery article.

The nickel-free austenitic stainless-steel powder according to the invention comprises by weight:

- 10<Cr<25%,
- 5<Mn<20%,
- 1<Mo<5%,
- 0.05≤C≤0.11%,
- 0≤Si<2%,
- 0≤Cu<4%,
- 0≤N<1%,
- 0≤O<0.3%, the balance consisting of iron and any impurities. Any impurities means elements the purpose of which is not to modify the property or properties of the alloy but the presence of which is unavoidable since they result from the powder manufacturing method. Any impurities such as B, Mg, Al, P, S, Ca, Sc, Ti, V, Co, Ni, Zn, Se, Zr, Nb, Sn, Sb, Te, Hf, Ta, W, Pb and Bi may in particular each be present in a concentration by mass of less than or equal to 0.5%. Within the meaning of the present invention, nickel-free austenitic stainless-steel therefore means an alloy not containing more than 0.5% as mass percentage of nickel. Advantageously, the nickel-free austenitic stainless-steel powder according to the invention furthermore has a diameter D90 of less than or equal to 150 μm.

Preferentially, the nickel-free austenitic stainless-steel powder according to the invention comprises by weight:

- 15<Cr<20%,
- 8<Mn<14%,
- 2<Mo<4%,
- 0.05≤C≤0.11%,
- 0≤Si<1%,
- 0≤Cu<0.5%,
- 0≤N<1%,
- 0≤O<0.2%, the balance consisting of iron and any impurities as aforementioned.

More preferentially, the nickel-free austenitic stainless-steel powder according to the invention comprises by weight:

- 16.5≤Cr≤17.5%,
- 10.5≤Mn≤11.5%,
- 3≤Mo≤3.5%,
- 0.05≤C≤0.11%,
- 0≤Si≤0.6%,
- 0≤Cu≤0.5%,
- 0≤N<1%,
- 0≤O<0.2%, the balance consisting of iron and any impurities as aforementioned.

The method for manufacturing the part consists in producing, by means of the aforementioned metal powder, a blank having substantially the form of the part to be manufactured, and then sintering this blank. The blank may be produced by injection moulding (MIM, standing for metal injection moulding), pressing, extrusion or additive manufacturing. More precisely, in the case of injection moulding, the blank may be produced by means of a mixture, also referred to as feedstock, comprising the metallic powder and an organic binder system (paraffin, polyethylene, etc.). Next, the feedstock is injected and the binder is eliminated by dissolving in a solvent and/or by thermal degradation.

The blank is sintered in an atmosphere comprising a nitrogen carrier gas ($N_2$ for example) at a temperature of between 1000 and 1500° C., preferably at a temperature of between 1100 and 1400° C., even more preferentially at a temperature of between 1200 and 1300° C., for a time of between 1 and 10 hours, preferably for a time of between 1 and 5 hours. The characteristics of the sintering cycle, particularly the temperature and the partial pressure of nitrogen, are dependent in particular on the composition of the alloy and are fixed so as to obtain a completely austenitic structure after sintering. It will be stated that the nitrogen content of the part can be adjusted by changing the nitrogen partial pressure of the atmosphere. In addition to the nitrogen, other gases may be used in the sintering atmosphere, such as hydrogen and argon.

The sintering cycle may be implemented in a single step in the aforementioned temperature and time ranges. It can also be envisaged implementing the sintering cycle in two steps with a first step in a range of temperatures between 1000 and 1200° C. for a time of between 30 minutes and 5 hours, followed by a second step in a range of temperatures of between 1200 and 1500° C., preferably between 1200 and 1300° C., for a time of between 1 and 10 hours. This first stage makes it possible to optimise the carbothermic reduction of the manganese oxides and/or of the mixed oxides of manganese and silicon and thus to obtain a deeper deoxidised layer.

After sintering the nickel-free austenitic stainless-steel powder according to the invention, supplementary heat treatments may be implemented on the sintered components such as for example a hot isostatic compression treatment to eliminate any residual porosity to the maximum possible extent.

A supplementary heat treatment may also consist in eliminating the residual surface porosity of the sample. Thus, in accordance with the application EP17202337.6, the supplementary heat treatment may consist in treating the sintered part to transform the austenitic structure into a ferritic or dual-phase ferrite+austenite structure on the surface of the part, and next to once again transform the ferritic or dual-phase ferrite+austenite structure into an austenitic structure so as to form a denser layer on the surface of the part. Moreover, after the sintering step, the part may be subjected to a finishing treatment by stamping, also termed forging.

After the sintering step, and before the finishing treatments, the parts may also be subjected to a surface densification treatment by forming ferrite from the surface. This is because since the diffusion of the alloy elements in the centred cubic structure of the ferrite is approximately two orders of magnitude greater than the diffusion of the elements in the centred face cubic structure of the austenite, the densification is much great when ferrite is present. To form the ferrite on the surface of the parts, several solutions are possible:

A. Fixing the temperature so that the alloy has on the surface a ferrite+austenite dual-phase or completely ferritic structure. On the surface, the nitrogen and the carbon that stabilise the austenitic phase diffuse in the solid and can be released into the atmosphere, which facilitates the formation of ferrite, in which the solubility of the carbon and nitrogen is much lower than in the austenite phase. At the core, where the concentration of nitrogen and carbon has not been reduced by diffusion through the surface, the composition of the alloy remains unchanged since the porosity was closed during the first step. Preferably, the temperature will be fixed so as to have a ferrite+austenite dual-phase or completely ferritic structure on the surface and a completely austenitic structure at the core, but it is possible, depending on the alloy and the parameters used during these first two sintering steps, that a little ferrite may also form in the core during this step.

B. Fixing the partial pressure of the nitrogen carrier gas, or even operating under an atmosphere devoid of nitrogen, so as to reduce the quantity of nitrogen on the surface of the parts by denitriding and thus form an austenite+ferrite or completely ferritic structure on the surface. In the core, where the nitrogen concentration has not been reduced by diffusion through the surface, the composition of the alloy remains unchanged and the structure stays completely austenitic.

C. Fixing the partial pressure of the carbon carrier gas, which is for example CO or $CH_4$, so as to reduce the quantity of carbon on the surface of the parts by decarburisation or more simply using a decarburising atmosphere, for example with $H_2$, if the alloy already contains carbon. Once again, the atmosphere must be selected so that the alloy has an austenite+ferrite dual-phase or completely ferritic structure at equilibrium. In the core, where the concentration of carbon has not been reduced by diffusion through the surface, the composition of the alloy remains unchanged and the structure stays completely austenitic.

D. Using any Combination of Solutions A, B and C.

In summary, during this stage, the aim is to form ferrite on the surface of the parts so as to obtain a very dense layer. As this ferrite forms in particular by denitriding and/or decarburisation, which are phenomena of diffusion in the solid, the thickness of this densified layer containing ferrite, for a given composition, depends on the temperature, the duration of the stage and the partial pressures of the nitrogen and/or carbon carrier gases. In the core, where the concentration of nitrogen and carbon has not been reduced by diffusion through the surface, the composition and therefore the structure remain unchanged since the porosity was closed during the first step. However, if the temperature is different between the first and the second step, it is possible that a little ferrite also forms in the core although the composition remains unchanged.

The parts obtained with the nickel-free austenitic stainless-steel powder according to the invention have, after sintering, a deoxidised surface layer the thickness of which is at least 200 μm, this thickness preferably being greater than or equal to 250 μm and, more preferentially, greater than or equal to 300 μm. In this deoxidised layer, the diameter of the oxides that are substantially circular in shape is less than 2 μm and the total surface or volume fraction of the oxides is less than 0.1%. FIG. 1 illustrates schematically the transition between the deoxidised layer 1 of thickness e and the remainder 2 of the part 3 including oxides 4 with a greater size and surface fraction. The demarcation line between the so-called deoxidised layer and the rest of sintered part and thus the thickness of the deoxidised layer can be determined easily under optical microscopy from one or more metallographic sections. Likewise, the surface or volume fraction of oxides can be determined by analysing optical microscopy images of polished sections of the part. The surface fraction corresponds to the ratio between the surface occupied by the oxides and the total surface area of the deoxidised layer analysed. The volume fraction can be deduced from the surface fraction by supposing that the oxides are circular in shape. It will be specified that this transition between the deoxidised layer and the rest of the sintered part can be observed only if the parts have at least on the surface an almost zero porosity, i.e. a relative density greater than or equal to 99%. This is because, when high porosity is present, it will be difficult to differentiate the oxides from the pores under optical microscopy.

Figure 2A:
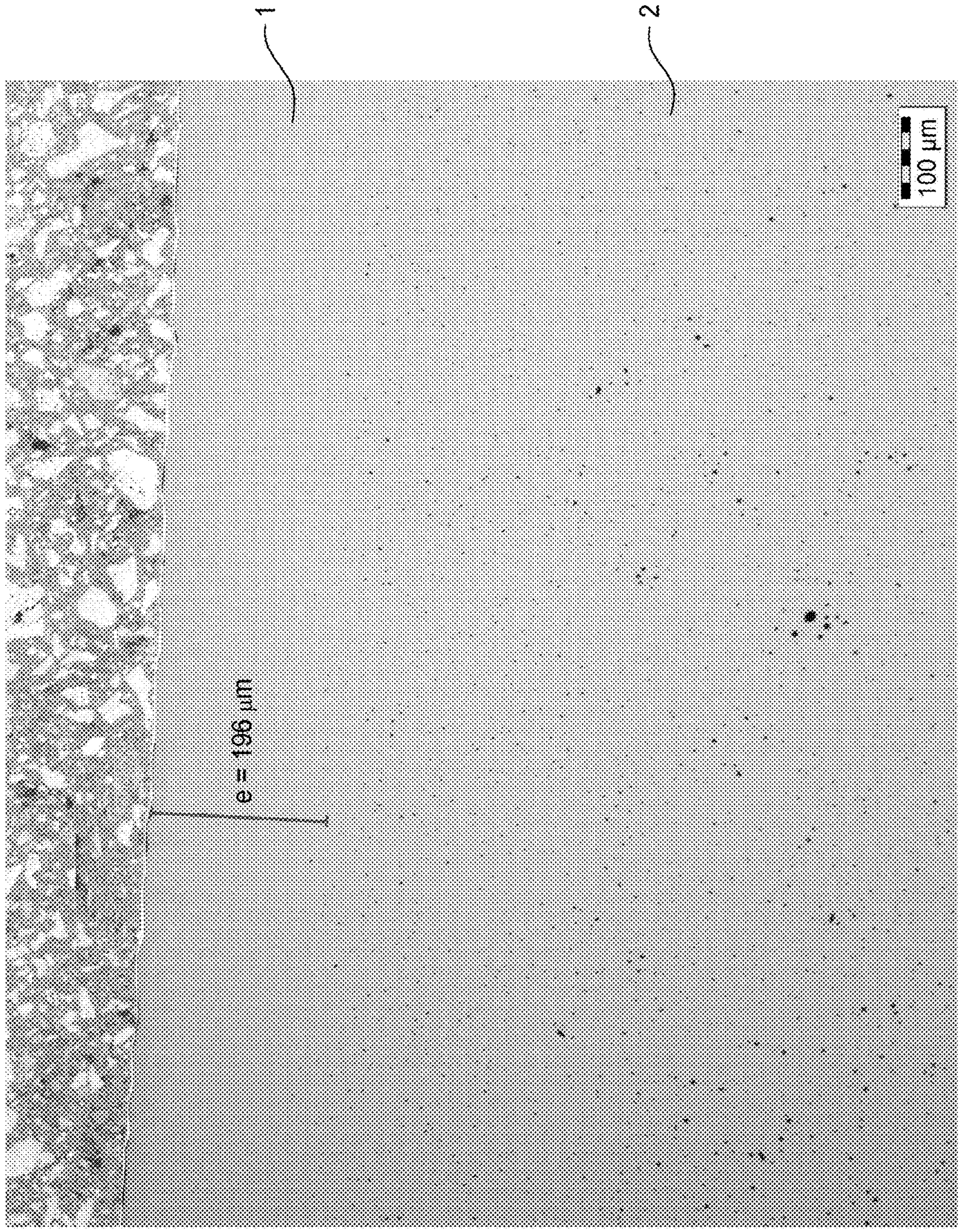
FIGS. 2A and 2B show respectively a metallographic section of a part according to the prior art and of a part according to the invention.

To illustrate the effect of the carbon on the deoxidation of the nickel-free austenitic stainless-steel powders, parts formed by MIM (metal injection moulding) from two powders (D90=16 μm) having different carbon concentrations were sintered at the same time in the same furnace. Metallographic sections were produced to measure and compare the thickness of the deoxidised layer between the two parts. Sintering was implemented in a reducing atmosphere comprising 75% $N_2$ and 25% $H_2$ at a pressure of 850 mbar with a first stage at 1200° C. for 3 hours followed by a second stage at 1300° C. for 2 hours. A comparative sample was produced by means of a powder comprising 0.03% by weight carbon. More precisely, this is an Fe-17Cr-11Mn-3Mo-0.5Si-0.1O-0.5N-0.03C (% by weight) powder. A view under optical microscopy of a cross-section of the sample after polishing is shown in FIG. 2A. A transition line between the deoxidised layer 1 and the remainder 2 of the sample is clearly observed. The thickness of the deoxidised layer is approximately 196 μm. Measurements performed on several sections showed that the values are substantially similar from one section to another.

Figure 2B:
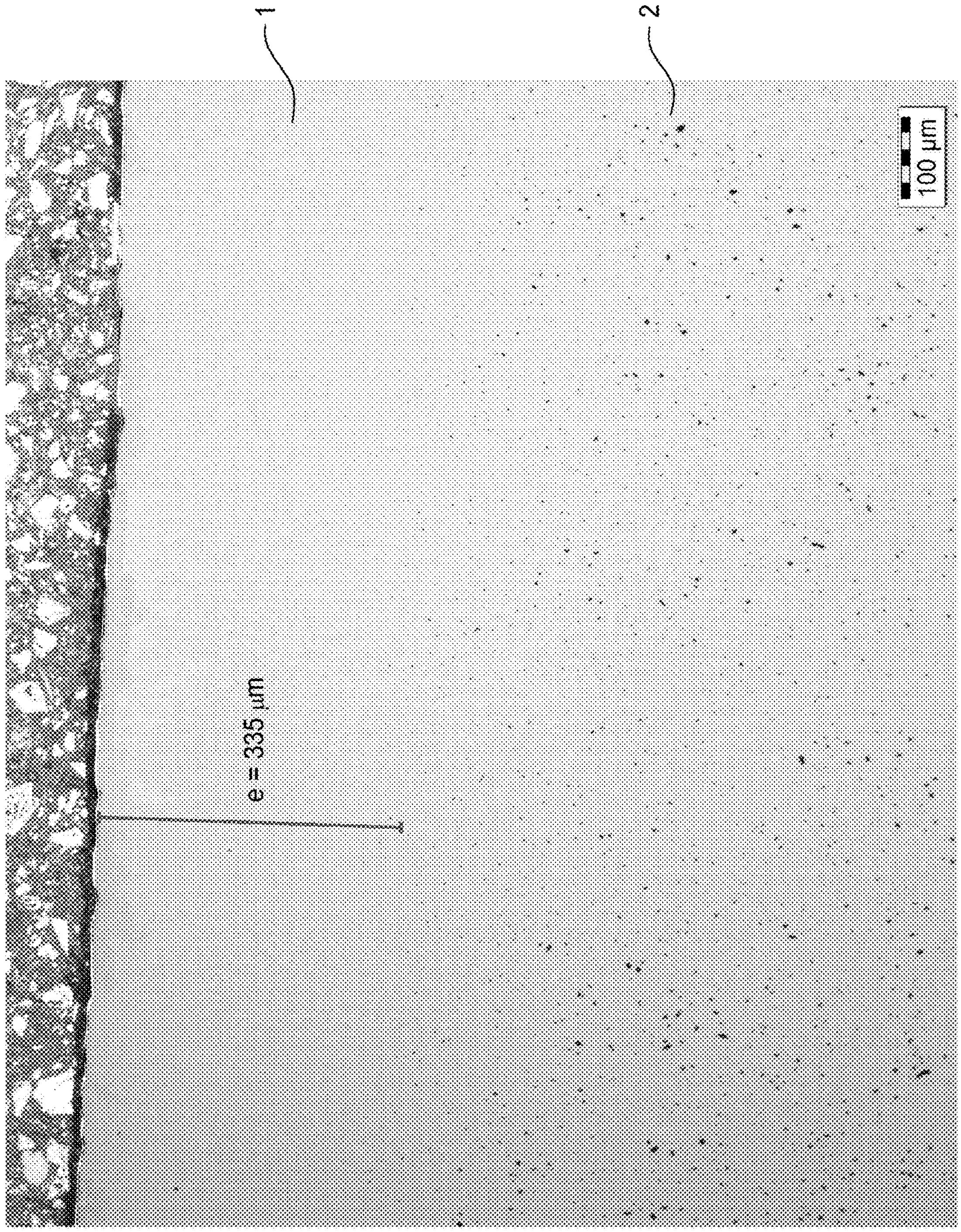

A sample according to the invention was produced by means of a powder comprising 0.07% by weight carbon. More precisely, this is an Fe-17Cr-11Mn-3Mo-0.5Si-0.1O-0.5N-0.07C (% by weight) powder. A view under optical microscopy of a cross-section of the sample after polishing is shown in FIG. 2B. A transition line between the deoxidised layer 1 and the remainder 2 of the sample is also clearly observed. The thickness of the deoxidised layer is appreciably greater, with a value of approximately 335 μm.

Tests were also performed with a powder comprising 0.18% by weight carbon, i.e. an Fe-17Cr-11Mn-3Mo-0.5Si-0.1O-0.5N-0.18C (% by weight) powder. The decarburisation resulting from the reaction of the carbon with the hydrogen of the atmosphere caused very great differences in carbon concentration within the same load, i.e. starting from the same powder composition, with differences with regard to the microstructure of the parts as a consequence.

It goes without saying that the present invention is not limited to the above description and that various modifications and simple variants can be envisaged without departing from the scope of the invention as defined by the accompanying claims. It will have been understood from the above that the present invention relates to the sintering of parts by means of nickel-free austenitic stainless-steel powders and that the aim thereof is to procure such parts that have a surface layer as thick as possible devoid of its oxides to the maximum extent. Nevertheless, such steels comprise high manganese concentrations. However, manganese is a component having a strong affinity for oxygen and the oxides that it forms can be eliminated only at temperatures of around the sintering temperatures. However, at the sintering temperature, the porosity closes rapidly, which makes it more difficult to eliminate the oxides wherein the manganese is included. Faced with this problem, the Applicant has shown that nickel-free austenitic stainless-steel compositions containing a concentration of carbon at least equal to 0.05% by weight and not exceeding 0.11% by weight made it possible to obtain sintered parts with a surface layer having a lower concentration of oxides and the thickness of which is greater than what has been observed on sintered parts obtained by means of known nickel-free austenitic stainless steels. It has in fact been observed that, for carbon concentrations of between 0.05% and 0.11% by weight, the presence of carbon makes it possible to deoxidise the sintered parts to a greater depth while avoiding a problematic decarburisation, this deoxidation being further reinforced by the fact that it can be implemented at temperatures lower than the sintering temperatures, for which the density is still low and the pores relatively open.

The invention claimed is:

1. An austenitic stainless-steel powder, comprising by weight:

16.5%<Cr<17.5%,
10.5%<Mn<11.5%,
3%≤Mo<3.5%,
0.05%≤C≤0.11%,
0%≤Si<0.6%,
0% Cu,
0.5%<N<1%,
0.1%≤O<0.2%,
0%≤Ni≤0.5%, and
0% Sn, with a balance formed by iron and possible impurities each having a content of between 0 and 0.5%, wherein the austenitic stainless-steel powder is in the form of particles having a diameter D90 of less than or equal to 16 μm.

2. A part, comprising the powder according to claim 1, wherein:

the part comprises a deoxidised layer on a surface of the part, the deoxidised layer comprises oxides having a diameter of less than or equal to 2 μm with a surface fraction of less than or equal to 0.1%, and the deoxidised layer has a thickness greater than or equal to 200 μm.

3. The part according to claim 2, wherein the deoxidised layer has a thickness greater than or equal to 250 μm.

4. The part according to claim 2, wherein the deoxidised layer has a thickness greater than or equal to 300 μm.

5. The part according to claim 2, wherein the deoxidised layer has a relative density greater than or equal to 99%.

6. The part according to claim 3, wherein the deoxidised layer has a relative density greater than or equal to 99%.

7. The part according to claim 4, wherein the deoxidised layer has a relative density greater than or equal to 99%.

8. The part according to claim 2, wherein the oxides are manganese oxides and/or mixed manganese and silicon oxides.

9. The part according to claim 2, which is a horological external part or a gemwork or jewellery article.

10. The part according to claim 9, wherein the external part is selected from the list consisting of a middle, a bottom, a bezel, a push-piece, a bracelet link, a bracelet, a tongue buckle, a dial, a hand, a crown and a dial index.

11. A watch, comprising the part according to claim 10.

12. A method for manufacturing an austenitic stainless-steel part, the method comprising:

providing the powder according to claim 1, producing a blank comprising the powder, wherein the blank has substantially the form of the austenitic stainless-steel part, and sintering the blank in an atmosphere comprising a nitrogen carrier gas at a temperature of between 1000 and 1500° C. for a time of between 1 and 10 hours to cause a carbothermic reaction between oxides and the carbon present in the blank and to densify the blank.

13. The method according to claim 12, wherein the sintering takes place in two steps with a first step performed at a temperature of between 1000 and 1200° C. for a time of between 30 minutes and 5 hours, followed by a second step performed at a temperature of between 120° and 1500° C. for a time of between 1 and 10 hours.

14. The method according to claim 12, wherein the blank is produced by injection moulding, extrusion, pressing, or additive manufacturing.

15. The method according to claim 12, further comprising a forging step after the sintering.

16. The method according to claim 12, further comprising a hot isostatic compression step after the sintering.

17. The method according to claim 12, further comprising, after the sintering, a surface transformation of the austenitic stainless steel into a surface of a ferritic or dual-phase ferritic+austenite structure, and a transformation of the surface of the ferritic or dual-phase ferrite+austenite structure into an austenitic structure, so as to form, on the surface of the part, a densified layer having a greater density than that of a core of the part, wherein the densified layer formation is achieved by using at least one of the following steps:

fixing the temperature so that the part has a ferrite+austenite dual-phase or completely ferritic structure on the surface and the nitrogen and the carbon which stabilize the austenitic phase are allowed to diffuse in the solid and are released into the atmosphere;

fixing the partial pressure of the nitrogen carrier gas, or operating under an atmosphere devoid of nitrogen, so as to reduce the quantity of nitrogen on the surface of the part by denitriding, and thus forming an austenite+ferrite or completely ferritic structure on the surface; and fixing the partial pressure of a carbon carrier gas so as to reduce the quantity of carbon on the surface of the parts by decarburisation or using a decarburising atmosphere, if the alloy already contains carbon, so that the part has an austenite+ferrite dual-phase or completely ferritic structure at equilibrium.

18. The method according to claim 17, wherein the carbon carrier gas is CO or $CH_4$, and wherein the decarburising atmosphere is $H_2$.

* * * * *